(12) United States Patent
Fujimura et al.

(10) Patent No.: US 8,351,646 B2
(45) Date of Patent: Jan. 8, 2013

(54) HUMAN POSE ESTIMATION AND TRACKING USING LABEL ASSIGNMENT

(75) Inventors: Kikuo Fujimura, Palo Alto, CA (US); Youding Zhu, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1262 days.

(21) Appl. No.: 11/869,435

(22) Filed: Oct. 9, 2007

(65) Prior Publication Data

US 2008/0152191 A1    Jun. 26, 2008

Related U.S. Application Data

(60) Provisional application No. 60/871,419, filed on Dec. 21, 2006.

(51) Int. Cl.
*G06K 9/00* (2006.01)
(52) U.S. Cl. .................. 382/103; 382/190
(58) Field of Classification Search .............. None
See application file for complete search history.

(56) References Cited

U.S. PATENT DOCUMENTS

| | | | |
|---|---|---|---|
| 5,426,712 A | | 6/1995 | Nakajima |
| 6,166,746 A | * | 12/2000 | Inada et al. ............. 345/474 |
| 6,243,106 B1 | * | 6/2001 | Rehg et al. ............. 345/473 |
| 6,750,866 B1 | | 6/2004 | Anderson, III |
| 7,257,237 B1 | * | 8/2007 | Luck et al. ............. 382/103 |
| 7,317,836 B2 | * | 1/2008 | Fujimura et al. ........ 382/203 |
| 2002/0041327 A1 | | 4/2002 | Hildreth et al. |
| 2003/0169906 A1 | | 9/2003 | Gokturk et al. |
| 2003/0200236 A1 | | 10/2003 | Hong |
| 2003/0235334 A1 | | 12/2003 | Okubo |
| 2004/0036711 A1 | | 2/2004 | Anderson et al. |
| 2004/0120581 A1 | | 6/2004 | Ozer et al. |
| 2004/0240706 A1 | | 12/2004 | Wallace et al. |
| 2004/0247159 A1 | | 12/2004 | Damera-Venkata et al. |
| 2005/0261573 A1 | * | 11/2005 | Satoh et al. ............. 600/415 |
| 2005/0265583 A1 | * | 12/2005 | Covell et al. ............. 382/103 |
| 2008/0152191 A1 | * | 6/2008 | Fujimura et al. .......... 382/103 |
| 2009/0116732 A1 | * | 5/2009 | Zhou et al. ............. 382/154 |
| 2009/0244309 A1 | * | 10/2009 | Maison et al. ........... 348/222.1 |

FOREIGN PATENT DOCUMENTS

JP    9-237348    9/1997

(Continued)

OTHER PUBLICATIONS

PCT International Search Report and Written Opinion, PCT/US07/84453, Jun. 17, 2008, 8 pages.

(Continued)

*Primary Examiner* — Bhavesh Mehta
*Assistant Examiner* — Tahmina Ansari
(74) *Attorney, Agent, or Firm* — Fenwick & West LLP; Mark E. Duell

(57) ABSTRACT

A method and apparatus for estimating poses of a subject by grouping data points generated by a depth image into groups representing labeled parts of the subject, and then fitting a model representing the subject to the data points using the grouping of the data points. The grouping of the data points is performed by grouping the data points to segments based on proximity of the data points, and then using constraint conditions to assign the segments to the labeled parts. The model is fitted to the data points by using the grouping of the data points to the labeled parts.

18 Claims, 8 Drawing Sheets

FOREIGN PATENT DOCUMENTS

| JP | 2001-236505 | 8/2001 |
|---|---|---|
| JP | 2004-303150 | 10/2004 |
| JP | 2007-514211 | 5/2007 |
| WO | WO 2006/099597 | 9/2006 |

OTHER PUBLICATIONS

Ankur Agarwal et al, *3D Human Pose from Silhouettes by Relevance Vector Regression*, Proceedings of the 2004 IEEE Computer Society Conference on Computer Vision and Pattern Recognition—CVPR 2004, 2004.

Dragomir Anguelov et al, *Recovering Articulated Object Models from 3D Range Data*, Uncertainty in Artificial Intelligence—Proceedings of the Twentieth Conference, Jul. 7-11, 2004, pp. 18-26.

Paul J. Besl et al, *A Method for Registration of 3-D Shapes*, IEEE Transactions on Pattern Analysis and Machine Intelligence, Feb. 1992, pp. 239-256, vol. 14, No. 2.

Ronan Boulic et al, *Real-Time IK Body Movement Recovery from Partial Vision Input*, Proceedings of ENACTIVE05—$2^{nd}$ International Conference on Enactive Interfaces Genoa, Italy, Nov. 17-18, 2005, pp. 1-11.

Samuel R. Buss et al, *Selectively Damped Least Squares for Inverse Kinematics*, Journal of Graphics Tools, 2005, pp. 37-49, vol. 10, No. 3.

Fabrice Caillette, *Real-Time Multi-View Human Body Tracking Using 3D Voxel Reconstruction and High-Level Movement Prediction*, A Transfer Report submitted to the University of Manchester in the Faculty of Science and Engineering, Aug. 2002, pp. 1-51.

German K.M. Cheung et al, *Shape-From-Silhouette of Articulated Objects and its Use for Human Body Kinematics Estimation and Motion Capture*, Proceedings of the 2003 IEEE Computer Society Conference on Computer Vision and Pattern Recognition (CVPR'03), 2003.

David Demirdjian et al, *3-D Articulated Pose Tracking for Untethered Diectic Reference*, Proceedings of the Fourth IEEE International Conference on Multimodal Interfaces (ICMI'02), 2002, pp. 1-6.

David Demirdjian et al, *Avoiding the "Streetlight Effect": Tracking by Exploring Likelihood Modes*, IEEE, 2005, pp. 357-364.

Ruth Devlaeminck, *Human Motion Tracking With Multiple Cameras Using a Probabilistic Framework for Posture Estimation*, A Thesis Submitted to the Faculty of Purdue University, Aug. 2006, pp. 1-64.

D.M. Gavrila, *The Visual Analysis of Human Movement: A Survey*, Computer Vision and Image Understanding, Jan. 1999, pp. 82-98, vol. 73, No. 1.

Daniel Grest et al, *Nonlinear Body Pose Estimation from Depth Images*, Pattern Recognition—$27^{th}$ DAGM Symposium, Aug./Sep. 2005, pp. 285-292.

Lorna Herda et al, *Hierarchical Implicit Surface Joint Limits for Human Body Tracking*, EPFL Technical Report ID: IC/2004/09, pp. 1-21.

Michael Isard et al, *Compensation—Conditional Density Propagation for Visual Tracking*, International Journal of Computer Vision, 1998, pp. 5-28, vol. 29, No. 1.

Nebojsa Jojic et al, *Detection and Estimation of Pointing Gestures in Dense Disparity Maps*, ECE Department and Beckman Institute.

Nebojsa Jojic et al, *Tracking Self-Occluding Articulated Objects in Dense Disparity Maps*, The Proceedings of the Seventh IEEE International Conference on Computer Vision, Sep. 20-27, 1999, pp. 123-130.

Roland Kehl et al, *Full Body Tracking from Multiple Views Using Stochastic Sampling*, Computer Vision Laboratory (BIWI), ETH Zurich, Switzerland.

Jon Kleinberg et al, *Approximation Algorithms for Classification Problems with Pairwise Relationships: Metric Labeling and Markov Random Fields*, Journal of the ACM, Sep. 2002, pp. 616-639, vol. 46, No. 5.

Steffen Knoop et al, *Sensor Fusion for 3D Human Body Tracking with an Articulated 3D Body Model*, Proceedings of the 2006 IEEE International Conference on Robotics and Automation, May 2006, pp. 1686-1691.

Mun Wai Lee et al, *Proposal Maps Driven MCMC for Estimating Human Body Pose in Static Images*, Proceedings of the 2004 IEEE Computer Society Conference on Computer Vision and Pattern Recognition—CVPR 2004, 2004.

J.P. Lewis et al, *Pose Space Deformation: A Unified Approach to Shape Interpolation and Skeleton-Driven Deformation*, SIGGRAPH, 2000, pp. 165-172.

Thomas B. Moeslund et al, *A survey of advances in vision-based motion capture and analysis*, Computer Vision and Image Understanding, 2006, pp. 90-126, vol. 104.

Xiaofeng Ren et al, *Recovering Human Body Configurations using Pairwise Constraints between Parts*, ICCV 2005 The Tenth International Conference on Computer Vision, Oct. 15-21, 2005.

Romer Rosales et al, *Learning Body Pose via Specialized Maps*, Advances in Neural Information Processing Systems 14—Proceedings of the 2002 Conference, 2002, pp. 1263-1270, vol. II.

Gregory Shakhnarovich et al, *Fast Pose Estimation with Parameter-Sensitive Hashing*, Proceedings Ninth IEEE International Conference on Computer Vision, Oct. 13-16, 2003, pp. 1-8.

Cristian Sminchisescu et al, *Kinematic Jump Processes for Monocular 3D Human Tracking*, Proceedings of the 2003 IEEE Computer Society Conference on Computer Vision and Pattern Recognition (CVPR'03), 2003, pp. 1-8.

Cristian Sminchisescu et al, *Discriminative Density Propagation for 3D Human Motion Estimation*, Proceedings of the 2005 IEEE Computer Society Conference on Computer Vision and Pattern Recognition (CVPR'05), Jun. 20-25, 2005.

Julius Ziegler et al, *Tracking of the Articulated Upper Body on Multi-View Stereo Image Sequences*, Proceedings of the 2006 IEEE Computer Society Conference on Computer Vision and Pattern Recognition (CVPR'06), 2006, pp. 1-8.

*IP_solve Reference Guide*, [online], pp. 1-2527, Retrieved from the internet <URL: http://Ipsolve.sourceforge.net/5/5>.

Japanese Patent Office, Office Action, Japanese Patent Application No. 2009-542998, May 8, 2012, fourteen pages.

Leung, M.K., "First Sight: A Human Body Outline Labeling System," *IEEE Transactions on Pattern Analysis and Machine Intelligence*, Apr. 1995, pp. 359-377, vol. 17, No. 4.

Li, B. et al. "Articulated Pose Identification with Sparse Point Features," *IEEE Transactions on Systems, Man and Cybernetics—Part B: Cybernetics*, Jun. 2004, pp. 1412-1422, vol. 34, No. 3.

PCT International Search Report and Written Opinion, PCT Application No. 2006/099597, Aug. 20, 2007, eight pages.

* cited by examiner

US 8,351,646 B2

HUMAN POSE ESTIMATION AND TRACKING USING LABEL ASSIGNMENT

RELATED APPLICATIONS

This application claims priority under 35 U.S.C. §119(e) to U.S. Provisional Patent Application No. 60/871,419 entitled "Human Pose Estimation and Tracking Using Label Assignment," filed on Dec. 21, 2006, the subject matter of which is incorporated by reference herein in its entirety. This application is also related to co-pending U.S. patent application Ser. No. 11/378,573 entitled "Pose Estimation Based on Critical Point Analysis," filed on Mar. 17, 2006, the subject matter of which is incorporated by reference herein in its entirety.

FIELD OF THE INVENTION

The present invention is related to machine vision, and more specifically to machine-based estimation and tracking of poses of subjects.

BACKGROUND OF THE INVENTION

Estimating and tracking poses of a human body is useful for various applications including, among other applications, action recognition, surveillance, and man-machine interaction. Estimating and tracking an arbitrary pose from an image or a video sequence remains a challenging problem because it often involves capturing subtle nuances in human poses. The problem is complicated by the fact that there are background distractions, changes in surrounding lighting conditions, and other disturbances.

There are multiple approaches for human pose estimation and tracking based on visual images or video sequences. Some approaches are bottom-up approaches where components of the body are detected. Then, the detected components are used to infer configuration of a whole body. The bottom-up approach is problematic in that it does not accurately and reliably detect various components in a cluttered scene.

Another group of approaches uses machine learning techniques. This approach is also problematic because a large number of poses can not be addressed.

Some approaches use silhouettes of the human body to estimate and track the poses of the human body. Using silhouettes has the advantage that ambiguity present in the images is reduced. This approach, however, is problematic because details necessary for reconstructing 3D human poses may be lost.

Some of the recent developments use a stream of depth images. The depth images contain a depth profile of a contour representing the human silhouette; and therefore, more information is available for pose estimation. Iterative Closet Point (ICP) is often used with the depth images as a method for fitting 3D model to 3D data points generated from the depth images. For example, J. Ziegler et al. "Tracking of the articulated upper body on multi-view stereo image sequences," CVPR 2006 discloses using unscented Kalman filters together with the ICP approach to reconstruct the poses of the upper human body based on a 3D data points obtained by four stereo image streams. A common issue with the ICP approaches, however, is that the model may drift away from the data or that the ICP sometimes results in local minima. To avoid drifting away or the problem of resulting in the local minima, an initial configuration is critical for the ICP. However, it is difficult to set the initial configuration appropriately for all images, especially when the changes of motions between the images are large.

In the above approaches, the computing requirements for tracking and estimating the poses may be demanding. If the tracking and estimating algorithm is too slow, then some images may have to be skipped to perform tracking and estimation within the time constraint. Skipping the images, however, is problematic because it reduces the accuracy of the tracking and estimation of the poses.

What is needed is an improved method and apparatus for estimating and tracking human poses that accurately tracks and detects various human poses. There is also a need for a method and apparatus for estimating and tracking the human poses that avoids the local minima problem. There is also a need for estimating and tracking human poses with less demanding computation to provide real time estimation and tracking of human poses.

SUMMARY OF THE INVENTION

An embodiment of the present invention provides a method for estimating and tracking a pose of a subject (e.g., human) which involves two steps: (i) grouping data points obtained from image capturing devices into groups representing labled parts of the subject, and (ii) fitting a model representing the subject to the data points using the groups of the data points. The 3D coordinates of the pixels are obtained from the image capturing devices and then grouped into segments that minimize a cost function. The segments are then grouped into the groups based on constraint conditions and the pose vector of the subject in a previous image. Then, model fitting is performed, for example using inverse kinematics, on the grouped data points to refine the labeling and to obtain parameters of the pose otherwise unavailable from labeling alone.

In one embodiment, parameters of the model are initialized prior to grouping the data points into groups representing the labeled parts. The model initialization can be performed by detecting a predetermined pose of the subject.

In one embodiment, nearby data points are grouped into segments. Then the segments are grouped into the labeled parts of the subject using constraint conditions. The constraint conditions include, among other conditions, that the segments in a similar location should be grouped to the same labeled parts or nearby labeled parts, the data points outside a circle or box fitted to certain labeled parts should not be grouped into that labeled part (e.g., the segments outside a circle fitted to a head should not be labeled as the head), a group of data points having a distinctive depth profile different from other parts of the depth image should be grouped into certain labeled parts, and a group of data points having a similar color or the same color in a color image should be grouped into certain labeled parts.

In one embodiment, to fit the model to the data points using the labeled parts, vertices of the model that should be visible to the image capturing devices are determined. Then the data points in a labeled part are searched to identify the data points that correspond to the vertices of the same labeled part of the model. The pose vector is estimated from the vertices of the model and the 3D coordinates of the data points by using the inverse kinematics.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
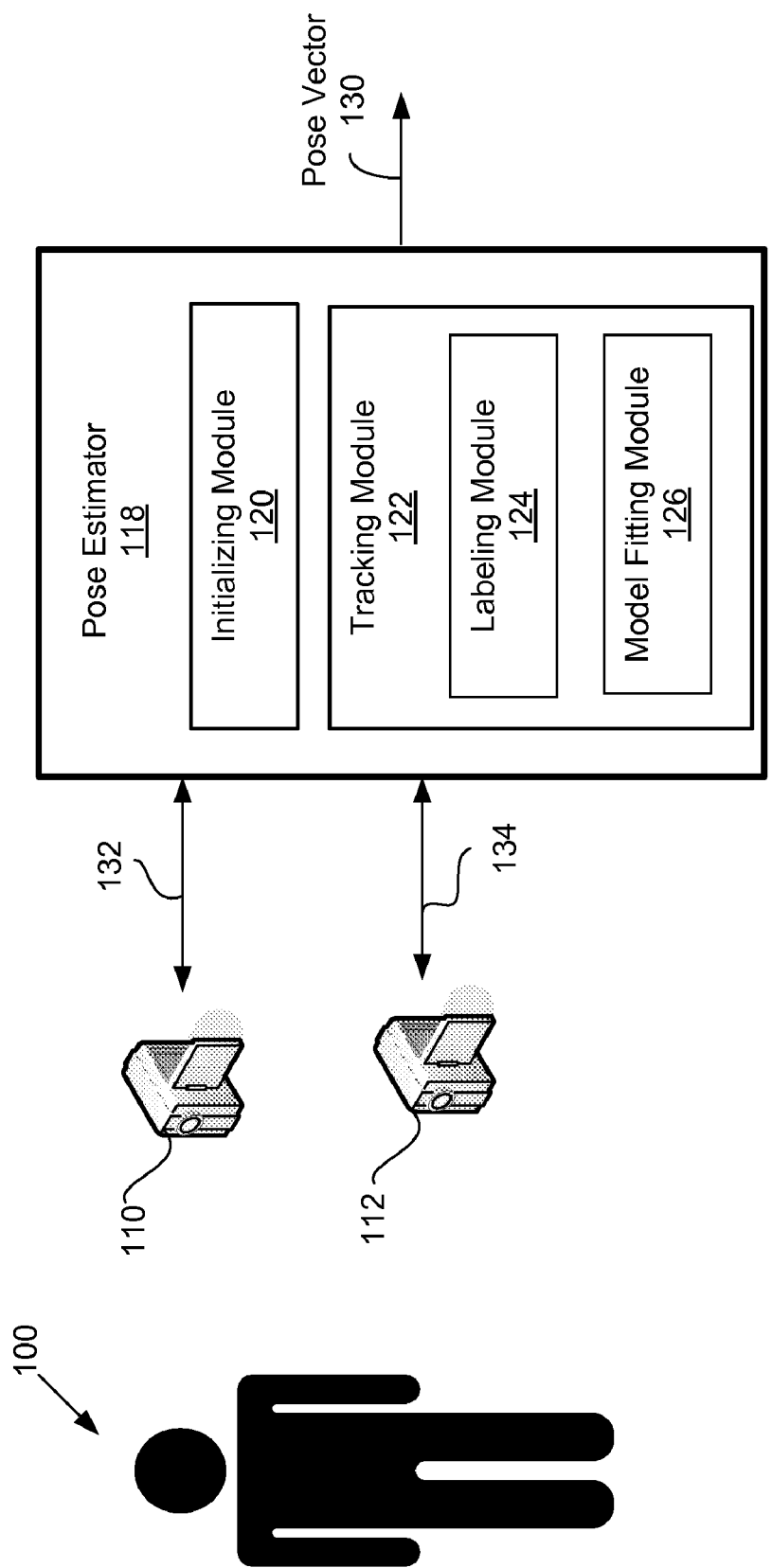
FIG. 1 illustrates a schematic diagram of an apparatus for estimating and tracking the pose of a subject according to one embodiment.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

One embodiment for a method of estimating and tracking a pose of a subject includes two major steps: (i) grouping data points to labeled parts, and (ii) fitting a model representing the subject to the data points using the grouping of the data points. In the step of labeling, the data points of the subject generated from depth images are grouped into segments. The segments are then grouped into labeled parts (e.g., head, torso, left arm, right arm) using various constraint conditions. In the step of model fitting, inverse kinematics is performed on points of the labeled parts to obtain the pose vector of a model fitting the data points. The pose vector obtained from the model fitting are output as the estimate of the pose and are also used for estimating and tracking the poses of the subject in a next depth image.

A subject herein refers to any moving objects that have more than one poses. The moving objects include, among other objects, animals, people, and robots. Although embodiments herein are described with reference to humans as the subject, note that the present invention can be applied essentially in the same manner to any other objects or animal having more than one poses.

The labeled parts herein refer to any portion of the subject that can be conceptually identified as a group of joints and links. For example, in a human subject, the labeled parts include, among other parts, a head, a torso, a left arm, a right arm, a left hand, a right hand, a left leg, and a right leg. The labeled parts can be subdivided into other parts (e.g., a left arm has a left upper arm and a left forearm). Note that the number of labeled parts is not limited, and can be increased or decreased according to the purposes of the pose estimation and tracking.

A model herein refers to a representation of the subject by joints and links. In one embodiment, the model is a human body represented as a hierarchy of joints and links with a skin mesh attached. Various models with joints and links can be used as the model of the subject.

The constraint conditions refer to conditions derived from the structure or properties of the subject. The constraint conditions include, among other conditions, that data points in similar locations should be grouped to the same labeled parts or nearby labeled parts, the data points belonging to the same or similar labeled parts should have a similar depth profile in a depth image, and the data points of the same or similar labeled parts should have a similar color profile in a color image.

Overview of Apparatus and Method for Pose Estimation and Tracking

FIG. 1 illustrates a schematic diagram of a pose estimator 118 for estimating and tracking the poses of a subject human body 100 according to one embodiment. In the embodiment of FIG. 1, the pose estimator 118 is coupled to two image sources: (i) a depth camera 110 generating depth images 132 that represent distances from the camera 110 to various points of the human body 100 in a grayscale image, and (ii) a video camera 112 capturing color images 132 of the human body 100. In one embodiment, the depth camera 110 is a Swiss Ranger depth camera that produces grayscale images 132 representing 3D data points of the human body 100 at the speed of 17 frames per second, and the video camera 112 is a Sony DFWV500 camera that provides the color images 134 of 640×480 resolution at the speed of 15 frames per second.

The pose estimator 118 includes, among other modules, an initializing module 120, and a tracking module 122. The initializing module 120 performs model initialization as explained below in detail with reference to FIG. 3. The tracking module 122 of the pose estimator 118 includes, among other modules, a labeling module 124 and a model fitting module 126. The pose estimator 118 outputs pose vector 130 of the estimated pose of the human body 100 as explained below in detail with reference to FIG. 8.

In one embodiment, the depth image 132 is generated from multiple cameras, or structured light sensors instead of the depth camera 110. In another embodiment, the depth image 134 can be generated from combining inputs from the depth camera 1110 and other sensing devices (e.g., multiple cameras or light sensors).

Figure 2:
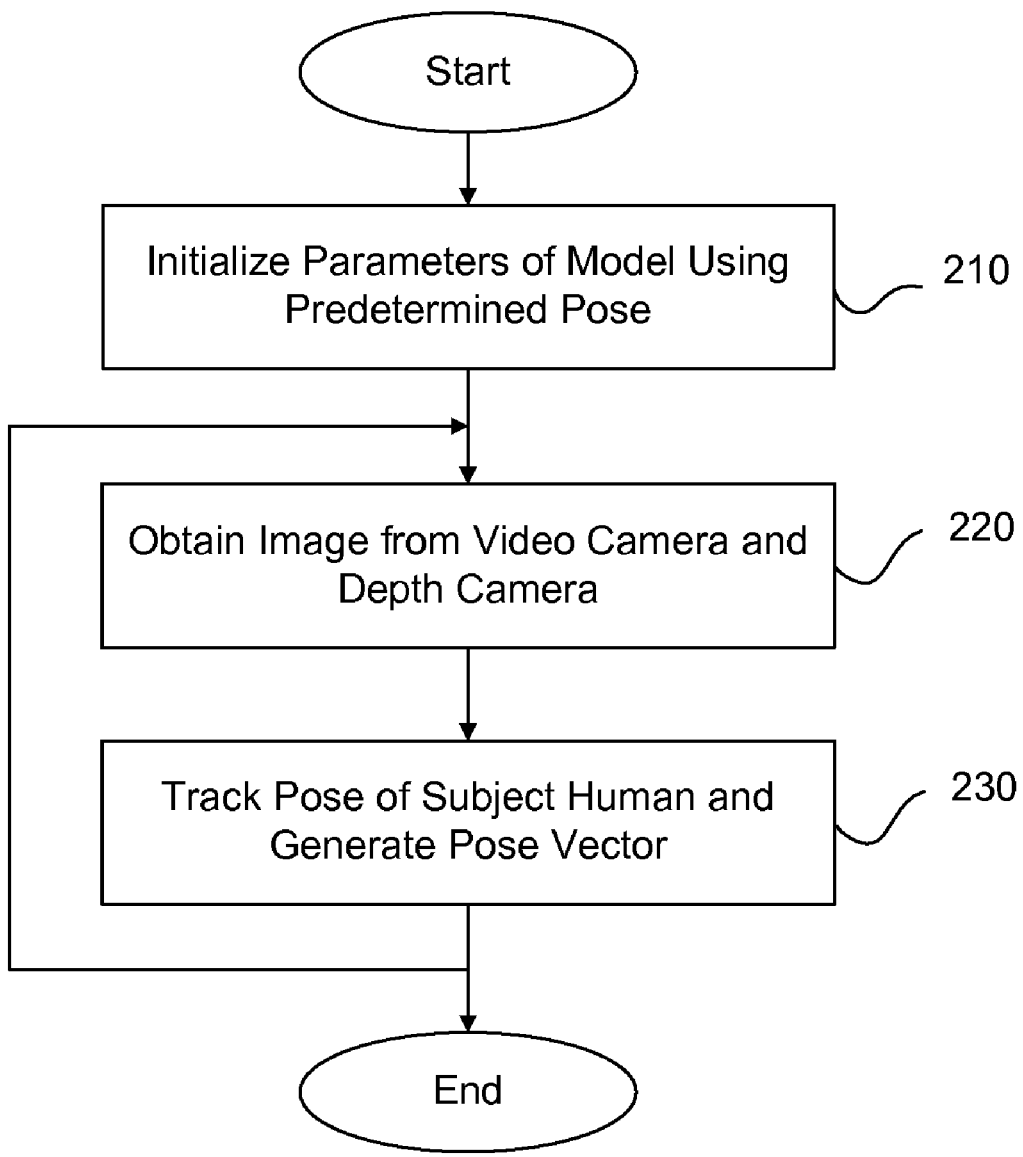
FIG. 2 illustrates a flowchart of a method of estimating and tracking the pose of the subject according to one embodiment.

FIG. 2 illustrates a flowchart of a method of estimating and tracking the poses of the human body 100 according to one embodiment. First, the pose of the subject human body 100 is initialized 210 using a predetermined pose (e.g., T-pose where the subject faces the depth camera 110 with both arms stretching down and spread sideways) as explained below in detail with reference to FIG. 3. After initializing the parameters of the model, the next sequences of images are obtained 220 from the video camera 112 and the depth camera 110. Then the human body 100 is tracked and the pose vector 130 is generated 230 as explained below in detail with reference to FIGS. 4 to 8.

Model Initialization

Figure 3:
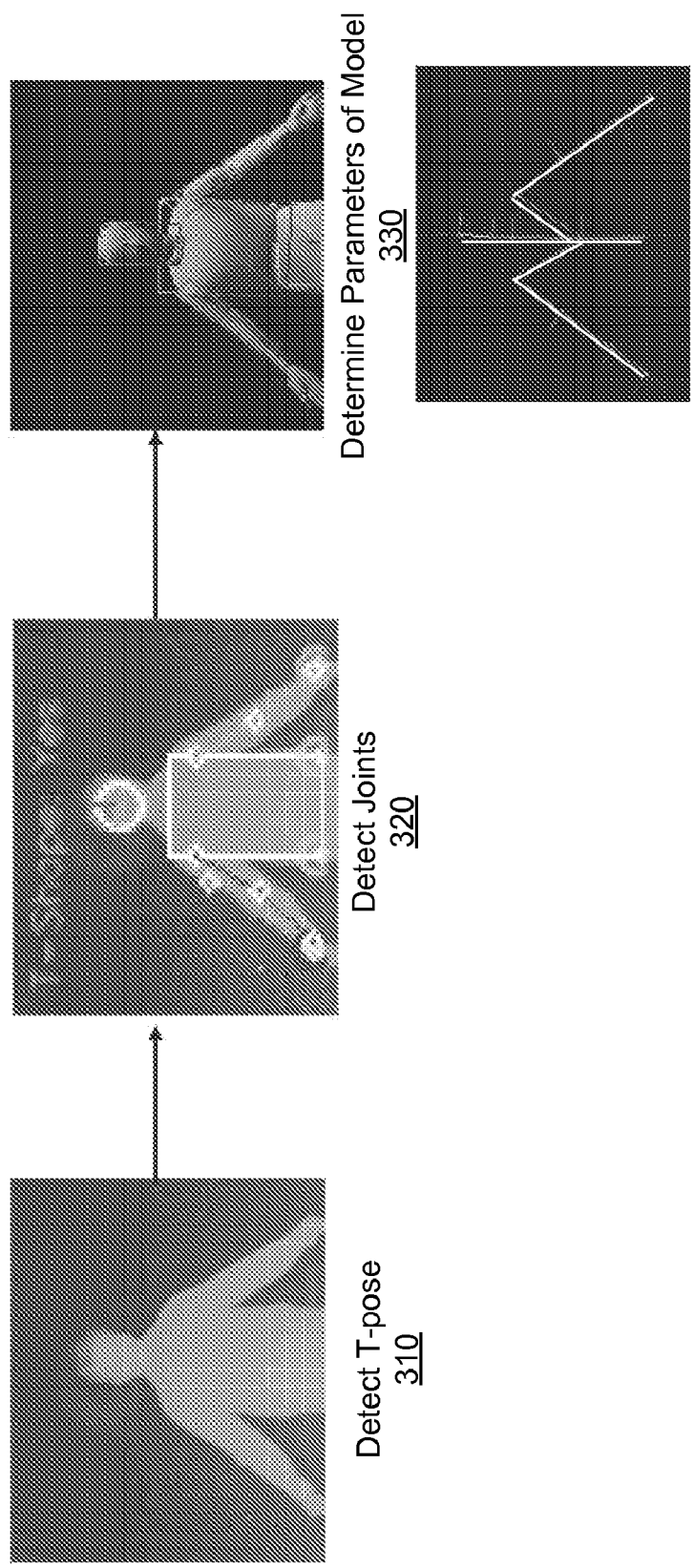
FIG. 3 illustrates a flowchart of a method for initializing parameters of a model according to one embodiment.

FIG. 3 illustrates a flowchart of a method for initializing parameters of the model. In one embodiment, the initialization is performed based on the T-pose. First, the T-pose is detected 310 from the depth image 132. To detect the T-pose, a Support Vector Machine (SVM) based detector can be used. Specifically, the features of the T-pose are detected using a Fast-Fourier Transform (FFT) on the depth image 132 by determining distance between the pixels in the contour of the T-pose image.

After detecting the T-pose, the joints of the human body 100 are detected 320 using, for example, a method described in co-pending U.S. patent application Ser. No. 11/378,573 filed on Mar. 17, 2006, entitled "Pose Estimation Based on Critical Point Analysis," which is incorporated by reference herein in its entirety. Alternatively, the joints of the human body 100 may be determined from the median x and y coordinate values of pixels within the labeled parts of the body.

Using the detected joints, parameters 418 of the model are generated 330. During the determination of the parameters 418 of the model, the parameters of the model (e.g., the length of the forearm, and the height of the torso) are adjusted based on the detected joints. The parameters 418 of the model determined are stored in the model fitting model 126 to estimate and track the poses of the human body 100 based on subsequently received sequences of the depth images 132.

Modules and Method for Tracking Pose

Figure 4:
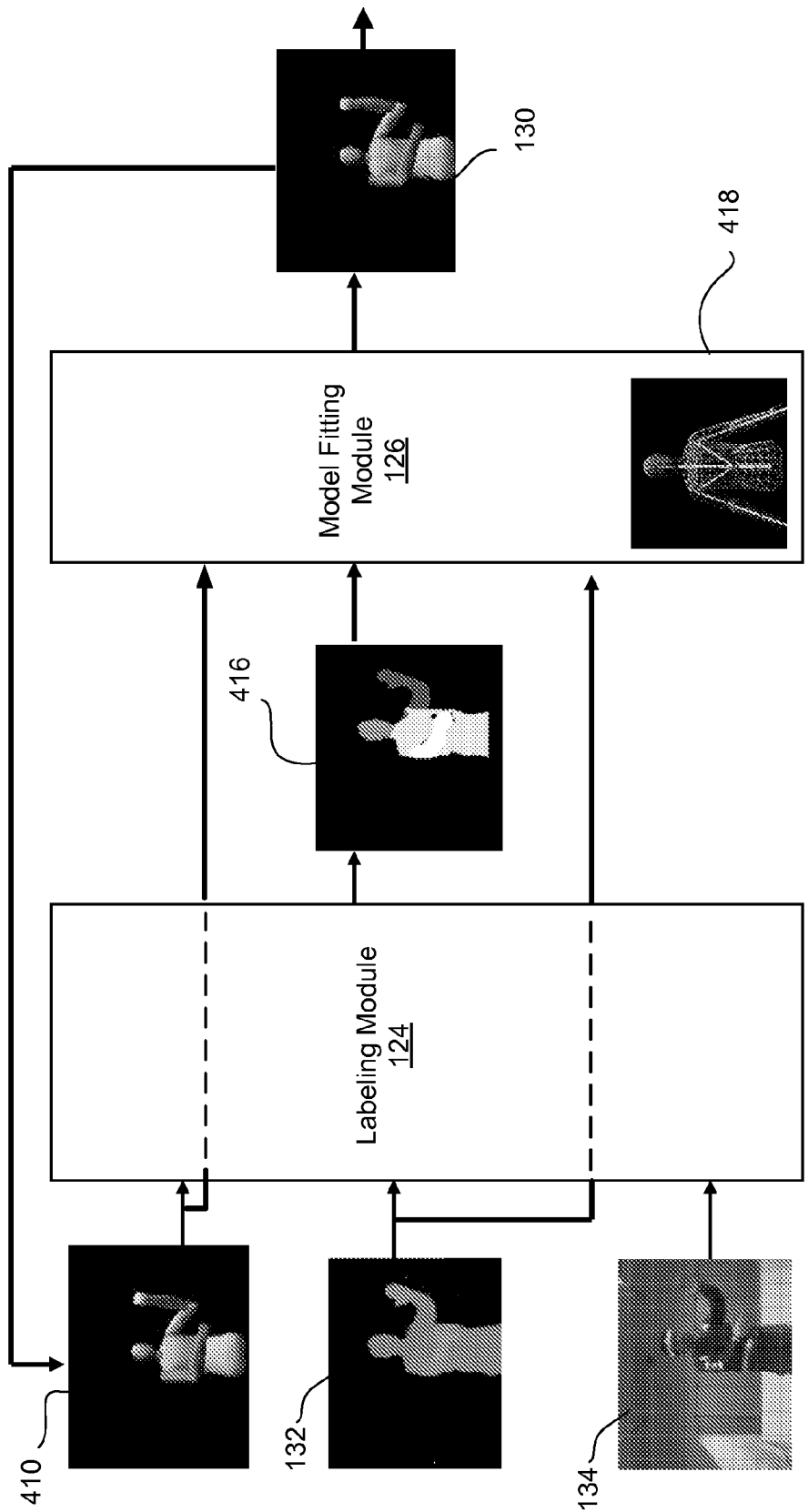
FIG. 4 illustrates a block diagram of a tracking module of the apparatus for tracking the pose of the subject according to one embodiment.

FIG. 4 illustrates a block diagram of the tracking module 122 of the pose estimator 118 for tracking the poses of the human body 100 according to one embodiment. The tracking module 122 of the pose estimator 118 includes, among other modules, the labeling module 124 and the model fitting module 126. The labeling module 124 receives the pose vector 410 generated from a previous image, the current depth image 132, and the current color image 134. Then, the labeling module 124 groups the 3D data points generated from the depth image 132 into the labeled parts as explained below in detail with reference to FIG. 6 to generate label information 416 for each data point. Note that the labeling module 124 and the model fitting module 126 can be implemented as a single module. Also note that the labeling module 124 and the model fitting module 126 can be implemented as hardware, firmware, software, for example, or any combinations thereof.

The model fitting module 126 receives the pose vector 410 generated from previous frames of images, the depth image 132 of the current image, the label information 416. The model fitting module 126 uses the pose vector 410, the current depth image 132, and the label information 416 together with the initialized parameters 418 of the model (obtained from the initialization module 120 and stored in the model fitting module 126) to generate the current pose vector 130 as explained below in detail with reference to FIG. 8. The pose vector 130 generated by the model fitting module 126 are then fed back to the labeling module 124 and the model fitting module 126 as the pose vector 410 of the previous image.

Figure 5:
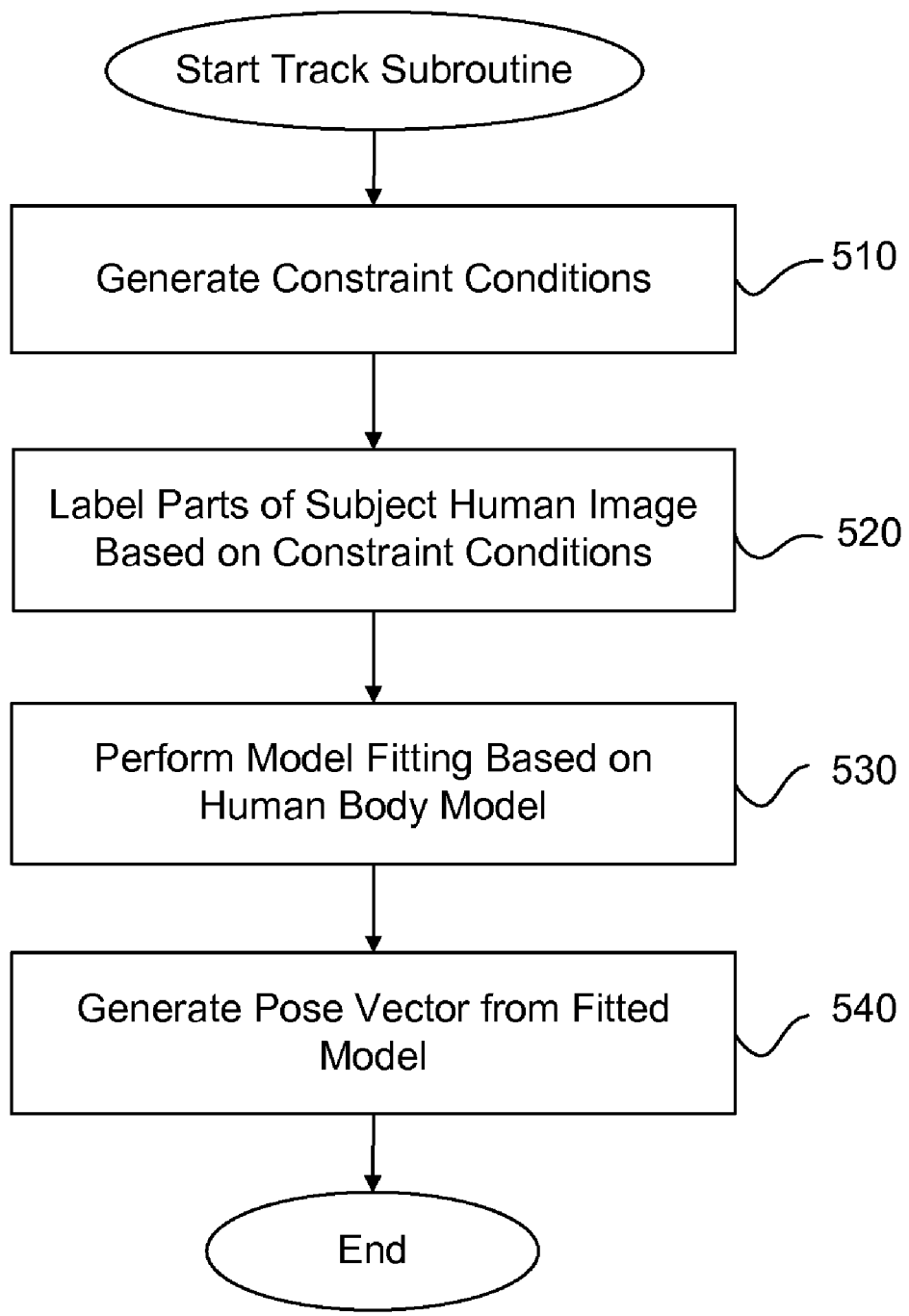
FIG. 5 illustrates a flowchart of a subroutine for tracking and estimating pose of the subject according to one embodiment.

FIG. 5 illustrates a flowchart of a subroutine for tracking and estimating poses of the human body 100 according to one embodiment. First, the constraint conditions for grouping the segments to the labeled parts are generated 510 as explained below in detail with reference to FIG. 6. Then the 3D data points generated from the depth image 132 are labeled 520 using the constraint conditions. To group the 3D data points to the labeled parts, the 3D data points are first grouped into multiple segments, and then the multiple segments are grouped into the labeled parts as explained below in detail with reference to FIG. 6.

Figure 7:
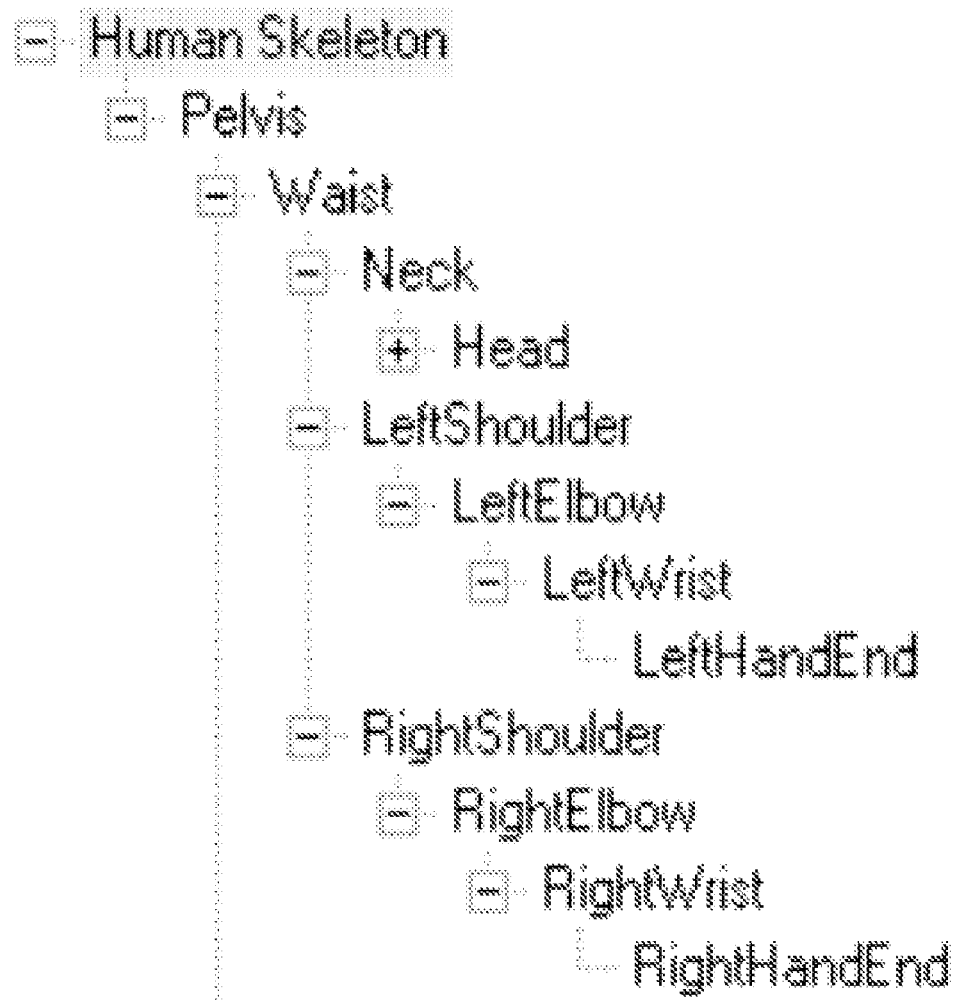
FIG. 7 illustrates a hierarchy of a structured model according to one embodiment.

Based on the labeling, the model fitting is performed 530 as explained below in detail with reference to FIG. 7. By fitting the labeled parts into the model, the accuracy of the labeling is improved and parameters of the poses (e.g., angle between the forearm and upper arm) otherwise unavailable can be obtained.

Labeling with Optimization

Figure 6:
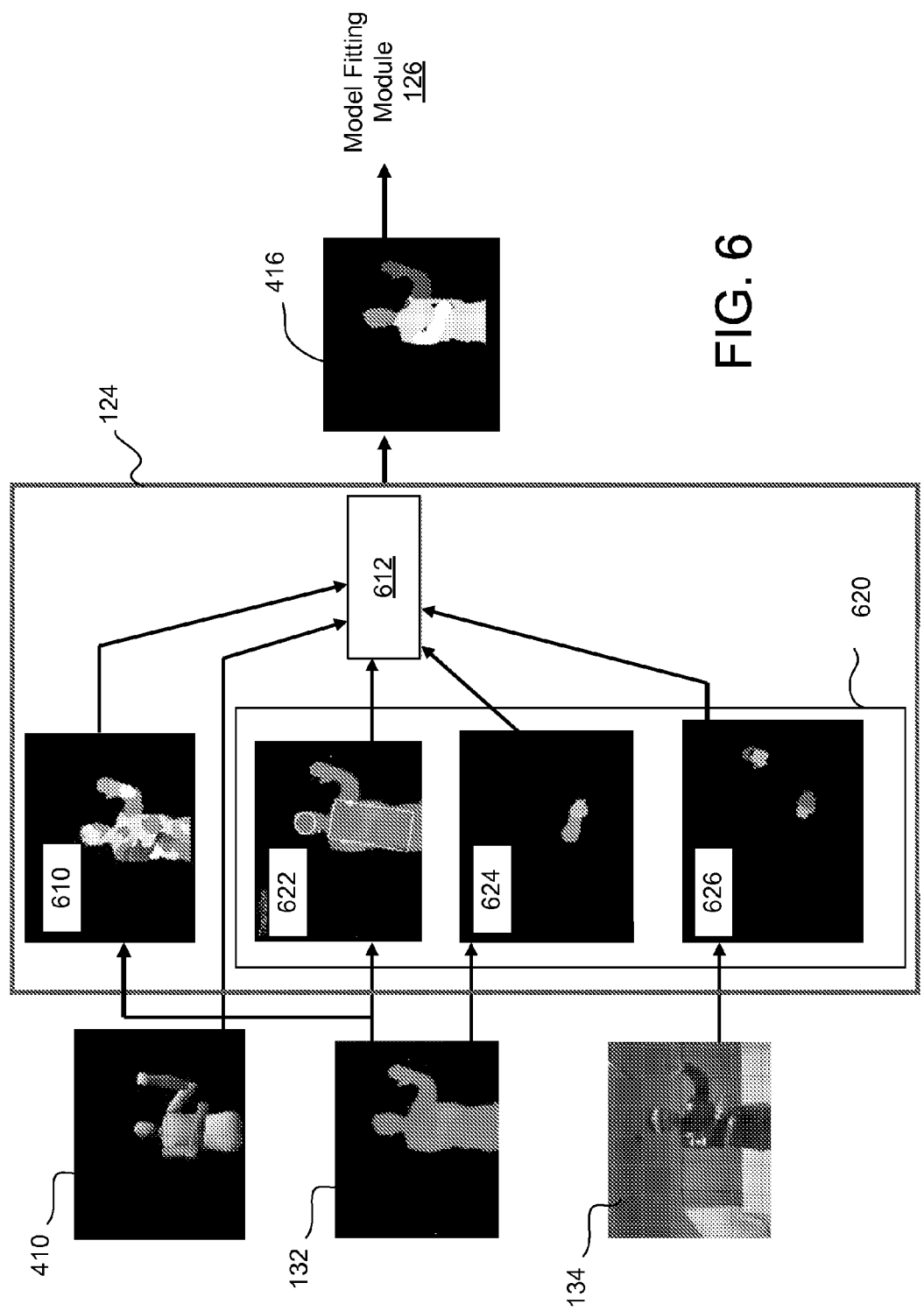
FIG. 6 illustrates a block diagram of a labeling module according to one embodiment.

FIG. 6 illustrates a block diagram of the labeling module 416 according to one embodiment. The labeling module 416 includes a segment generator 610, a constraint support module 620, and an optimization engine 612. The segment generator 610 groups the 3D data points generated from the depth image 132 into segments based on the similarity of the depth profile and spatial positions of the 3D data points. In one embodiment, the segment generator 610 reiteratively partitions the 3D data points into segments $s_i$ (i=1,2, ..., N)∈S by k-mean clustering (with k=2) until each segment is sufficiently small in size and has small depth variances. In one embodiment, the segment generator 610 also performs edge detection of the depth image 132. Any two pixels located at different sides of an edge are grouped to different segments.

The constraint support module 620 generates applicable constraint conditions and sends the applicable constraint conditions to the optimization engine 612. Different constraint conditions can be applied depending on the available sources of the images, and the performance (e.g., processor speed) of the pose estimator 118. In one embodiment, the constraint support module 620 includes a head and torso tracking module 622, a depth scanning module 624, and a color detection module 626.

The head and torso tracking module 622 tracks the head and torso of the human body 100 and provides to the optimization engine 612 the constraint conditions derived from tracking the head and torso (hereinafter referred to as the "head and torso constraint condition"). Specifically, the head of the human body 100 is identified by fitting a circle to the predicted head contour of the depth image 132. The torso is identified by fitting a box to the predicted torso contour of the depth image 132. The box fitted to the torso has 5 degrees of freedom (x direction, y direction, height, width, and orientation) and is positioned so that the number of data points of background surroundings the subject human 100 is minimized. If the head is not identified from the depth image 132 because it is occluded by other parts of the body (e.g., arm), the position of the head can be estimated from the box representing the torso.

The depth scanning module 624 scans the depth image 132 and identifies the 3D data points having a depth profile that is distinctive from other parts of the depth image 132. The 3D data points with a distinctive depth profile often represent a certain part of the body (e.g., an arm positioned in front of a torso). The depth scanning module 624 generates and sends the constraint conditions (hereinafter referred to as the "depth constraint condition") based on such distinctive depth profile to the optimization engine 612.

The color detection module 626 generates color constraint conditions and sends them to the optimization engine 612. The color constraint conditions refer to conditions that can be identified as certain parts of the body by certain color. For example, the hands of the human body 100 will often be exposed and will show up in skin color in the color image 134. Therefore, in some cases similarity in the colors of the data points can be used to label certain data points to certain parts of the body. The color constraint conditions can be very useful when different parts of the body are very close (e.g., the hand located very close to the torso), and the differences in the depth alone cannot identify these body parts. In one embodiment, a blob search is conducted to find the data points with certain colors. The blob search can be limited to certain areas of the color image to avoid detection of other blobs. For example, to detect the data points of hands, the blob search for skin color can be limited to areas where the face (also having the skin color) is unlikely to be present.

The optimization engine 612 groups the segments $s_i$ (i=1, 2, ..., N) obtained from the segment generator 610 into the labeled parts $\{p_1, p_2, \ldots, p_M\}$. In one embodiment, a segment si is assigned to a labeled part $\{p_1, p_2, \ldots, p_M\}$ by solving the following optimization problem.

$$\min \sum_{i=1}^{N} \sum_{j=1}^{M} c(i,j) A_{ij} + \sum_{e \in E} w_e Z_e \quad \text{Equation (1)}$$

where $$\sum_{j} A_{ij} = 1, (i = 1, 2, 3 \ldots N) \quad \text{Equation (2)}$$

$$Z_e = \frac{1}{2} \sum_{j} Z_{ej}, e \in E \quad \text{Equation (3)}$$

$$Z_{ej} \geq A_{pj} - A_{qj}; e = (p, q); (j = 1, \ldots, M) \quad \text{Equation (4)}$$

$$Z_{ej} \geq A_{qj} - A_{pj}; e = (p, q); (j = 1, \ldots, M) \quad \text{Equation (5)}$$

$$A_{ij} \in \{0, 1\}; i = 1, 2, 3 \ldots, N; (j = 1, \ldots, M) \quad \text{Equation (6)}$$

In the equations set forth above, the segments $s_i$ (i=1, 2, ..., N) are assigned to the labeled parts $\{p_1, p_2, \ldots, p_M\}$ to minimize $$\sum_{i=1}^{N} \sum_{j=1}^{M} c(i,j) A_{ij} + \sum_{e \in E} w_e Z_e$$

that represents a cost function of the labeling. In equation (1), c(i, j) represents the Euclidean distance from a segment $s_i$ to pixels randomly sampled from the labeled part $P_j$ in the model that is derived from the pose vector 410 of the previous image. $A_{ij}$ represents a value of either 0 or 1 that can be tabulated into an association table as shown below in Table 1. As represented by equation (6), if the segment $s_i$ belongs to the labeled part $P_j$, then $A_{ij}$ equals 1 whereas if the segment $s_i$ does not belong to the labeled part $P_j$ then $A_{ij}$ equals 0. The optimization problem presented by equations (1) to (6) is to find an assignment of 0 and 1 to all $A_{ij}$ that minimizes $$\sum_{i=1}^{N} \sum_{j=1}^{M} c(i,j) A_{ij} + \sum_{e \in E} w_e Z_e.$$

TABLE 1

| Association table A(i, j) | Head ($p_1$) | Torso ($p_2$) | Left Arm ($p_3$) | Right Arm ($p_4$) | ... ($p_M$) |
|---|---|---|---|---|---|
| Segment1 ($s_1$) | $A_{11}$ | $A_{12}$ | $A_{13}$ | $A_{14}$ | ($A_{1M}$) |
| Segment2 ($s_2$) | $A_{21}$ | $A_{22}$ | $A_{23}$ | $A_{24}$ | ($A_{2M}$) |
| Segment3 ($s_3$) | $A_{31}$ | $A_{32}$ | $A_{33}$ | $A_{34}$ | ($A_{3M}$) |
| ... | | | | | |
| SegmentN ($s_N$) | $A_{N1}$ | $A_{N2}$ | $A_{N3}$ | $A_{N4}$ | ($A_{NM}$) |

The right portion of equation (1) includes term $w_e$ where $w_e$ represents a weight indicating the strength of the relationship between the segments $s_i$ (i=1,2, ..., N). Segments adjacent to each other have strong relationship and are likely to be classified as the same labeled parts. Such strong relationship will be represented by a higher $w_e$. In contrast, segments not adjacent to each other have weak relationship. Such weak relationship is represented by a lower $w_e$. In equation (1), $Z_e$ is a parameter introduced to convert the problem of classifying segments to the labeled parts as represented by Table 1 to a linear programming optimization problem. In one embodiment, the weight $w_e$ is set as $e^{-\alpha d e}$ where de is the depth difference between two adjacent segments and $\alpha$ is a value selected based on experiments.

Equations (2) to (6) represent the constraint conditions to be applied for solving equation (1). Equations (3) to (5) (where $Z_{ej}$ represent the absolute value $|A_{pj} - A_{qj}|$) are derived from the constraint condition that neighboring segments should be grouped to the same or nearby labeled parts.

In addition to equations (2) to (6), additional constraint conditions may be added. In one embodiment, the constraint conditions from the head and torso tracking module 622, the depth scanning module 624, and the color detection module 626 are used. The head and torso tracking module 622 provides the constraint conditions represented by an equation $A_{i,1}=0$ for the segments that are located outside the circle fitted to the head, and an equation represented by $A_{i,2}=0$ for the segments located outside the box fitted to the torso. The depth scanning module 624, for example, provides the constraint condition represented by an equation $A_{i,3}+A_{i,4}=1$ for the segments that appear in front of the torso (that is, the segments represent a left arm or a right arm). Also, the color detection module 626, for example, provides the constraint condition represented by an equation $A_{i,3}+A_{i,4}=1$ for the segments where the data points have the color of the skin in the color image 134 (that is, these segments represent a left or right hand).

The optimization problem presented by equations (1) to (6) is an integer program which is NP-hard. In one embodiment, the optimization problem is simplified to a linear programming by allowing $A_{ij}$ to have non-integer values. Using such a simplification, the optimization problem presented by equations (1) to (6) can be solved efficiently by using publicly available software libraries such as lp_solve 5.5.0.10.

Model Fitting Using a Structured Model

By solving the above optimization problem, the 3D data points are grouped to the labeled parts $\{p_1, p_2, \ldots, p_M\}$. The grouping of segments into labeled parts, however, provides only rough grouping of the data points to labeled parts of the body. The grouping can be improved and refined by fitting the model (having the parameters set during the model initialization) to the data points as explained below with reference to FIGS. 7 and 8. Also, by fitting the labeled parts to the model, certain parameters (e.g., the position of an elbow) of the pose otherwise unidentifiable using the labeling alone can be obtained. The model fitting module 126 performs the model fitting using, for example, the method explained below with reference to FIG. 8.

In one embodiment, the model of the subject is represented as a hierarchy of joint and links with a skin mesh attached to them. To simplify the computation, the vertices of the model from a part of the skin are meshed to only one link and linear blending with multiple weights is not performed on the vertices. FIG. 7 illustrates an example of a hierarchically structured model having a pelvis as the root joint that includes a waist as a child joint. The waist joint includes a neck joint, a left shoulder joint, and a right shoulder joint. The left shoulder joint and the right shoulder joints in turn include other child joints (a left elbow joint and a right elbow joint).

Note that a pose of the subject can be represented by a set of pose vectors $q=(\theta_0, \theta_1, \ldots \theta_n)^T$ where $\theta_i$ represent an $i_{th}$ joint angle. In one embodiment, the degree of freedom (the number n) and joint limits (the range of value each $\theta_n$ can take) for each joint are limited based on biomechanical statistics. The root joint (i.e., pelvis in the example of FIG. 7) parameters include the global translation (the translational movement of the joint in a global coordinate system) as well as the joint angles. Conversely, the child joints (e.g., waist joint, neck joints) include only joint angles. As a consequence, when the pose vector $q=(\theta_0, \theta_1, \ldots \theta_n)^T$ is given, a location of vertex at time $t(v_{i,j}{}^t(q))$ can be computed as $$v_{i,j}{}^t(q) = M_i^t(q)(M_i^0(q))^{-1} v_{i,j}^0 \qquad \text{Equation (7)}$$

where $v_{i,j}^0$ is the position of the $j_{th}$ vertex associated with the $i_{th}$ joint at the initialization pose (e.g., T-pose), $M_i^0(q)$ is the global transformation matrix associated with the $i_{th}$ joint at the initialization pose, $M_i^t(q)$ is the global transformation matrix associated with the $i_{th}$ joint at time t, and $v_{i,j}{}^t(q)$ is the location of the $j_{th}$ vertex associated with the $i_{th}$ joint at time t.

Figure 8:
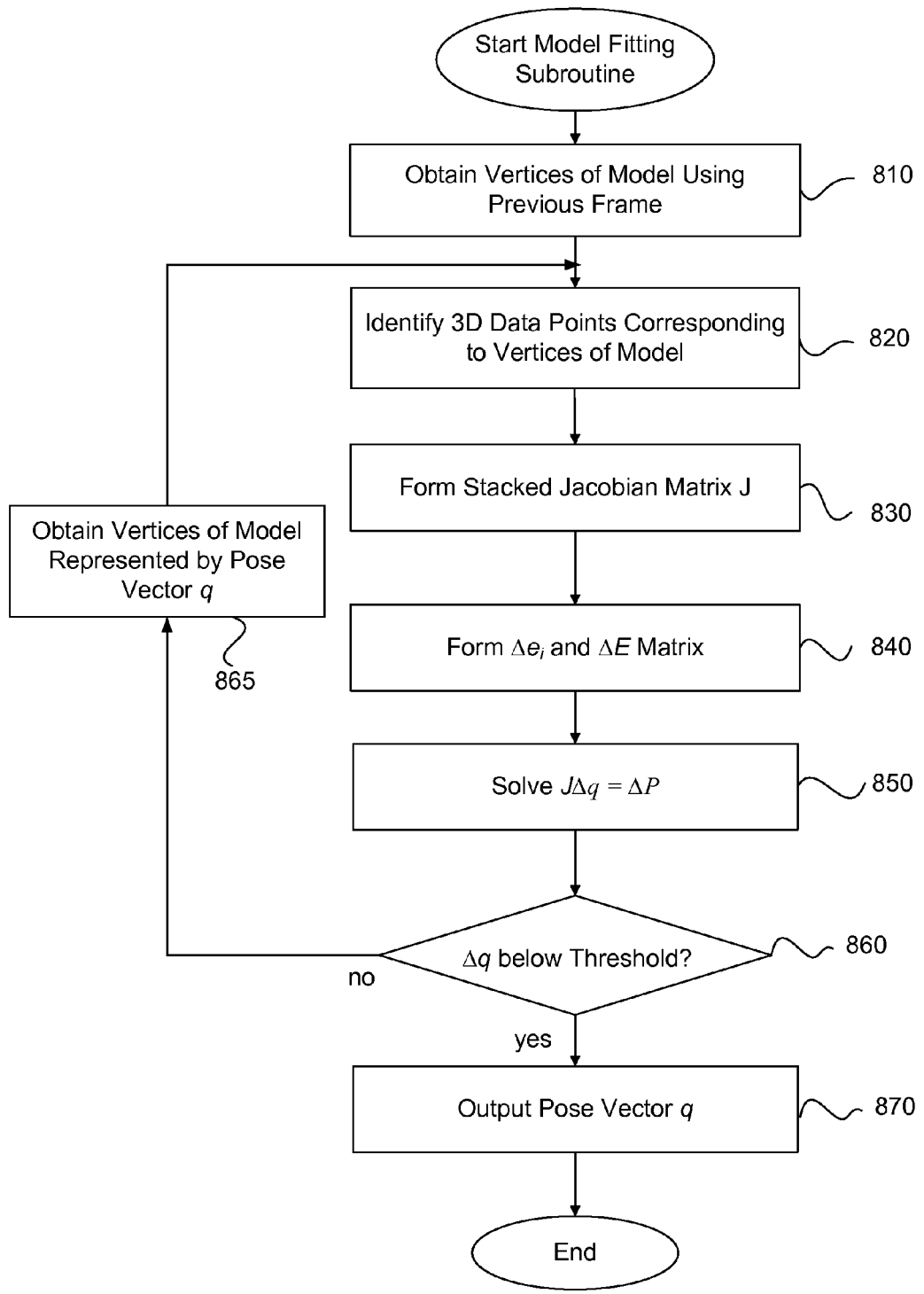
FIG. 8 illustrates a flowchart of a subroutine for model fitting a model to 3D data points according to one embodiment.

FIG. 8 illustrates a flowchart of a subroutine for fitting a model to the data points according to one embodiment. First, the vertices $V = \{v_1, v_2, \ldots, v_m\}$ of the model are obtained 810 from the pose vector 410 of the previous image. The vertices $V = \{v_1, v_2, \ldots, v_m\}$ include vertices that are visible from the pose of the model 410 in the previous image. Then, a set of data points $P = \{p_1, p_2, \ldots, p_m\}$ corresponding to the model vertices $V = \{v_1, v_2, \ldots, v_m\}$ are identified 820. The result of the estimation and tracking of the pose is dependent largely on the accuracy of finding the right data points $P = \{p_1, p_2, \ldots, p_m\}$ that correspond to the vertices $V = \{v_1, v_2, \ldots, v_m\}$ of the model. In one embodiment, for each vertex $v_i$ in the labeled part $P_M$ of the previous image, a 3D data point $p_i$ located closest to the vertex $v_i$ is identified from the 3D data points grouped to the labeled part $P_M$. By limiting the search to the 3D data points grouped to the labeled part $P_M$, not only the speed of searching the corresponding data points is increased but robustness of estimation and tracking of poses is also improved.

After obtaining the 3D data points $P = \{p_1, p_2, \ldots, p_m\}$ matching the vertices $V = \{v_1, v_2, \ldots, v_m\}$ of the model, the pose vector $q = (\theta_0, \theta_1, \ldots \theta_n)^T$ for the current depth image 132 is obtained by solving the following equation.

$$\hat{q} = \underset{q}{\arg\min} \| P - V(q) \|_2 \qquad \text{Equation (8)}$$

where V(q) represents the set of vertices when the pose vector is $q = (\theta_0, \theta_1, \ldots \theta_n)^T$.

In one embodiment, the damped least square with analytical Jacobian is used to solve equation(8). The damped least square method has the benefit of avoiding singularities, which makes the algorithm stable. The damped least square minimizes $\|J \Delta q - e\|^2 + \lambda \|\Delta q\|^2$, where $\Delta e = \|P - V(q)\|$, and $\lambda$ is a non-zero damping constant, and J is a stacked matrix formed 830 by stacking analytical Jacobian matrices for the $i_{th}$ vertex of the model. Specifically, the stacked matrix J can be represented as the following:

$$J = \begin{bmatrix} J_1 \\ J_2 \\ \ldots \\ J_m \end{bmatrix} \qquad \text{Equation (9)}$$

-continued $$J_i = \begin{bmatrix} 1 & 0 & 0 & 0 & 0 & 0 & \cdots & 0 \\ 0 & 1 & 0 & \frac{\partial p_i}{\partial \theta_3} & \frac{\partial p_i}{\partial \theta_4} & \frac{\partial p_i}{\partial \theta_5} & \cdots & \frac{\partial p_i}{\partial \theta_n} \\ 0 & 0 & 1 & 0 & 0 & 0 & \cdots & 0 \end{bmatrix} \quad \text{Equation (10)}$$

In above equation (10), the first three columns represent the global translation of the root joint, and the rest of the non-zero terms are computed by $$\frac{\partial p_i}{\partial \theta_j} = \overline{\omega}_j \times (v_i - o_i)$$

where $\overline{\omega}_j$ is the $j_{th}$ joint rotation axis in a global coordinate system and $o_i$ is the location of the $i_{th}$ joint in the global coordinate system, $(p_i^x, p_i^y, p_i^z)$ is a coordinate of an $i^{th}$ data point, and $\theta_i$ is an $i_{th}$ joint angle of the model.

Then, $\Delta e_i$ and $\Delta E$ matrices are formed 840 from $P=\{p_1, p_2, \ldots, p_m\}$ and $V=\{v_1, v_2, \ldots, v_m\}$ according to the following equations:

$$\Delta e_i = \begin{bmatrix} p_i^x - v_i^x \\ p_i^y - v_i^y \\ p_i^z - v_i^z \end{bmatrix} \quad \text{Equation (11)}$$

$$\Delta E = \begin{bmatrix} \Delta e_1 \\ \Delta e_2 \\ \ldots \\ \Delta e_m \end{bmatrix} \quad \text{Equation (12)}$$

Then, the equation $J\Delta q=\Delta P$ is solved 850 by a damped least square method using the following equations:

$$\Delta q = (J^T J + \lambda I)^{-1} J^T \Delta E \quad \text{Equation (13)}$$

$$q' = q + \Delta q \quad \text{Equation (14)}$$

Then it is determined 860 whether $\Delta q$ is below a threshold value. If $\Delta q$ is not below the threshold value, the vertices of the model represented by a newly calculated $q'=(\theta_0, \theta_1, \ldots \theta_n)^T$ are obtained. Then the process returns to the step 820 where the 3D data points corresponding to the vertices of the newly calculated pose vector $q'=(\theta_0, \theta_1, \ldots \theta_n)^T$ are identified 820. Then the subsequent steps (with $q'$ replacing $q$) are repeated. If $\Delta q$ is below the threshold value, then the pose vector $q=(\theta_0, \theta_1, \ldots \theta_n)^T$ obtained from solving the equations are provided as an output 870 and the subroutine ends. The output pose vector $q=(\theta_0, \theta_1, \ldots \theta_n)^T$ is also provided to the labeling module 124 and the model fitting module 126 as the pose vector 410 of the previous image.

Results of Experiments Using Optimized Labeling and Model Fitting

An embodiment was tested on sequences of poses of human. In this embodiment, the depth images 132 were obtained using Swiss ranger SR3000 depth camera and the color images were obtained using Sony DFWV500 video camera. A motion capture system of PhaseSpace Inc. of San Leandro, Calif. was coupled with eight cameras to obtain actual coordinates of eight major joints of the subject human for comparison with the estimated coordinates of the joints obtained using the embodiment. In the experiments, markers were attached to the subject human to generate the actual coordinates.

Test motion sequences include a set of martial art movements including basic Taiji movements. The sequences were tracked successfully at the frame rate of 2 to 3 Hz on a Pentium 4 running at 2.13 GHz. The errors of various locations of the joints obtained from the embodiment compared to the actual coordinates are shown in the following Table 1 for the Taiji motion sequence.

TABLE 2

| Model Joints | error (in millimeter) | | |
|---|---|---|---|
| | $\Delta X(\mu, \sigma)$ | $\Delta Y(\mu, \sigma)$ | $\Delta Z(\mu, \sigma)$ |
| Right Hand | (−15, 49) | (−39, 58) | (23, 44) |
| Right Elbow | (−23, 34) | (−70, 42) | (−48, 59) |
| Right Shoulder | (21, 57) | (−43, 19) | (1, 25) |
| Waist | (−24, 26) | (−12, 15) | (−19, 14) |
| Left Hand | (16, 61) | (−6, 86) | (44, 45) |
| Left Elbow | (30, 35) | (−74, 39) | (71, 66) |
| Left Shoulder | (−23, 53) | (−36, 30) | (27, 30) |
| Head | (−15, 26) | (−18, 15) | (−22, 15) |
| Overall | (−4, 49) | (−37, 50) | (22, 52) |

As seen from Table 2, the overall tracking error was approximately 5 cm (where the subject stood 1.5 m to 2 m from the cameras).

Further experiments were conducted to confirm the robustness of the embodiment for estimating and tracking poses involving fast movements. The sampling intervals tested were one to four. That is, only one image from k consecutive images was taken and the rest of the images were skipped. The following Table 3 shows that the embodiment is effective up to k=4 without compromising much of the accuracy.

TABLE 3

| Sampling interval | Tracking error for Left Hand | | | |
|---|---|---|---|---|
| k | $X(\mu, \sigma)$ | $Y(\mu, \sigma)$ | $Z(\mu, \sigma)$ | IK iteration |
| 1 | (−40, 58) | (86, 76) | (38, 33) | 1 |
| 2 | (−31, 66) | (88, 78) | (33, 35) | 3 |
| 3 | (−27, 63) | (93, 83) | (28, 47) | 3 |
| 4 | (−31, 64) | (88, 76) | (28, 44) | 3 |

Various combinations of the constraint conditions were used to confirm the effect of changes in the combination. The results are tabulated in Table 4. In Table 4, constraint condition 1 denotes the head and torso constraint condition, constraint condition 2 denotes the depth constraint condition, and constraint condition 3 denotes the color constraint condition. In the last row, only the constraint conditions represented by equations (2) to (6) were used. Table 4 shows that the best result was achieved when all of the constraint conditions were used.

TABLE 4

| Constraint Conditions | Tracking error for Left Hand | | | |
|---|---|---|---|---|
| | $X(\mu, \sigma)$ | $Y(\mu, \sigma)$ | $Z(\mu, \sigma)$ | IK iteration |
| 1 + 2 + 3 | (−40, 58) | (86, 76) | (38, 33) | 1 |
| 1 + 2 | (−30, 62) | (90, 85) | (24, 42) | 1 |
| 1 + 3 | (−31, 71) | (86, 86) | (28, 44) | 1 |
| 2 + 3 | (−34, 70) | (84, 86) | (27, 42) | 1 |
| 1 | (−31, 71) | (86, 86) | (28, 44) | 1 |
| 2 | (−33, 68) | (83, 93) | (26, 45) | 1 |
| 3 | (−37, 68) | (84, 89) | (26, 46) | 1 |
| No constraint | (−34, 67) | (83, 88) | (28, 41) | 1 |

The embodiment was also compared with estimation and tracking using only the Iterative Closet Point (ICP). When only the ICP was used, the tracking and estimation occasionally failed and did not recover in the subsequent images whereas the embodiment functioned even in the cases where the ICP failed. The method using the ICP was also slower because more iteration was needed for convergence.

ALTERNATIVE EMBODIMENTS

In one embodiment, the size of the segments is controlled according to the frame rates of the images received from the depth camera and the video camera. If the processing speed of the pose estimator is not fast enough to handle the images received, then the size of the segments are increased to speed up the segmentation process. Conversely, if the processing speed of the pose estimator is sufficiently fast to handle more frame rates, the size of the segments is decreased, which generally results in more accurate estimation and tracking of the poses.

In one embodiment, the pose estimator can detect and track multiples subjects. For example, the pose estimator can detect and identify more than one subject from the depth images (and color images).

In one embodiment, the images received from the depth camera and video camera are preprocessed by filters before being provided to the pose estimator. For example, a median filter may be used to remove pixel values above or below a certain rnage.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A method for estimating and tracking poses of a subject, the method comprising:
   generating data points of the subject from a first depth image including the subject by a depth camera, the first depth image representing distances from the depth camera to different parts of the subject;
   grouping the data points into a plurality of segments of the data points based on, at least, depth profiles of the data points and spatial positions of the data points;
   grouping the segments of the data points into labeled parts of the subject based on, at least, spatial relationships between the segments and constraint conditions by:
      calculating a cost of assigning the segments to the labeled parts; and
      assigning the segments to the labeled parts where the cost is minimized; and
   fitting a model representing the subject to the data points using the groups to generate a pose vector representing the pose of the subject estimated from the data points.

2. The method of claim 1, wherein the step of fitting the model comprises:
   determining vertices of a previous model visible to the depth image camera, the previous model generated from a second depth image preceding the first depth image;
   obtaining the data points of the first depth image that correspond to the vertices of the model generated from the second depth image; and
   estimating a pose vector of the subject in the first depth image based on the vertices of the model and the corresponding data points.

3. The method of claim 2, wherein the step of estimating the pose vector of the model comprises performing inverse kinematics.

4. The method of claim 2, wherein the step of estimating the pose vector of the model comprises:

generating a stacked matrix $$J = \begin{bmatrix} J_1 \\ J_2 \\ \ldots \\ J_m \end{bmatrix}$$

by stacking Jacobian matrix $$J_i = \begin{bmatrix} 1 & 0 & 0 & 0 & 0 & 0 & \cdots & 0 \\ 0 & 1 & 0 & \frac{\partial p_i}{\partial \theta_3} & \frac{\partial p_i}{\partial \theta_4} & \frac{\partial p_i}{\partial \theta_5} & \cdots & \frac{\partial p_i}{\partial \theta_n} \\ 0 & 0 & 1 & 0 & 0 & 0 & \cdots & 0 \end{bmatrix},$$

where $$(p_i^x, p_i^y, p_i^z)$$

represents a coordinate of an $i^{th}$ data point, and $\theta_i$ represents an $i^{th}$ joint angle of the model, generating a difference matrix $$\Delta E = \begin{bmatrix} \Delta e_1 \\ \Delta e_2 \\ \ldots \\ \Delta e_m \end{bmatrix}, \text{ where } \Delta e_i = \begin{bmatrix} p_i^x - v_i^x \\ p_i^y - v_i^y \\ p_i^z - v_i^z \end{bmatrix}$$

and $(v_i^x, v_i^y, v_i^z)$; represents a coordinate of an $i^{th}$ vertex of the model; and reiteratively solving $J\Delta q = \Delta P$ until $\Delta q$ is below a threshold where $q = (\theta_0, \theta_1, \ldots \theta_n)^T$ represents a pose vector and $P = (p_1, p_2, \ldots, p_m)$ represents the data points corresponding to the vertices.

5. The method of claim 1, wherein the constraint conditions comprises:
   a fitted part constraint condition representing that first data points outside a shape fitted to a first group not be grouped to the first group;
   a depth constraint condition representing that second data points having a depth profile be grouped to a second group; and
   a color constraint condition representing that third data points be grouped to a third group responsive to pixels of a color image corresponding to the third data points having a predetermined color.

6. The method of claim 1, wherein the segments of the data points are grouped into labeled parts further by:
   modifying assignment of the segments to the labeled parts.

7. The method of claim 1, wherein the grouping of the segments is performed using an optimization algorithm.

8. The method of claim 1, further comprising the step of initializing parameters of the model using a predetermined pose of the subject.

9. The method of claim 8, wherein the step of initializing the parameters of the model comprises:
   detecting the predetermined pose of the subject;
   detecting locations of joints of the subject from the predetermined pose of the subject; and
   adjusting parameters of the model to fit the locations of the joints.

10. The method of claim 1, wherein the pose vector of the model fitted for the first depth image is used for grouping the segments of the data points into the labeled parts in a next depth image subsequent to the first depth image.

11. A non-transitory computer readable medium structured to store instructions executable by a processor, the instructions, when executed cause the processor to:

generate data points of the subject from a first depth image including the subject by a depth camera, the first depth image representing distances from the depth camera to different parts of the subject;

group the data points into a plurality of segments of the data points based on, at least, depth profiles of the data points and spatial positions of the data points;

group the segments of the data points into labeled parts of the subject based on, at least, spatial relationships between the segments and constraint conditions by instructions to:

calculate a cost of assigning the segments to the labeled parts; and assign the segments to the labeled parts where the cost is minimized; and fit a model representing the subject to the data points using the groups to generate a pose vector representing the pose of the subject estimated from the data points.

12. The computer readable medium of claim 11, wherein instructions for fitting the model comprises instructions causing the processor to:

determine vertices of the model visible to the depth image camera, the model generated from a second depth image preceding the first depth image;

obtain the data points of the first depth image that correspond to the vertices of the model in the second depth image; and estimate a pose vector of the subject in the first depth image based on the vertices of the model and the corresponding data points.

13. The computer readable medium of claim 12, wherein instructions for estimating the pose vector of the model comprises instructions causing the processor to:

generate a stacked matrix $$J = \begin{bmatrix} J_1 \\ J_2 \\ \ldots \\ J_m \end{bmatrix}$$

by stacking Jacobian matrix $$J_i = \begin{bmatrix} 1 & 0 & 0 & 0 & 0 & 0 & \cdots & 0 \\ 0 & 1 & 0 & \frac{\partial p_i}{\partial \theta_3} & \frac{\partial p_i}{\partial \theta_4} & \frac{\partial p_i}{\partial \theta_5} & \cdots & \frac{\partial p_i}{\partial \theta_n} \\ 0 & 0 & 1 & 0 & 0 & 0 & \cdots & 0 \end{bmatrix},$$

where $(p_i^x, p_i^y, p_i^z)$ represents a coordinate of an $i^{th}$ data point, and $\theta_i$ represents an $i^{th}$ joint angle of the model, generate a difference matrix $$\Delta E = \begin{bmatrix} \Delta e_1 \\ \Delta e_2 \\ \ldots \\ \Delta e_m \end{bmatrix}, \text{ where } \Delta e_i = \begin{bmatrix} p_i^x - v_i^x \\ p_i^y - v_i^y \\ p_i^z - v_i^z \end{bmatrix}$$

and $(v_i^x, v_i^y, v_i^z)$ represents a coordinate of an $i^{th}$ vertex of the model; and reiteratively solve $J\Delta q = \Delta P$ until $\Delta q$ is below a threshold where $q = (\theta_0, \theta_1, \ldots \theta_n)^T$ represents a pose vector and $P = (p_1, p_2, \ldots, p_m)$ represents the data points corresponding to the vertices.

14. The computer readable medium of claim 11, further storing instructions causing the processor to initialize parameters of the model using a predetermined pose of the subject.

15. The computer readable medium of claim 11, further storing instructions causing the processor to use the pose vector of the model generated from the first depth image to group the segments of the data points into the labeled parts of a next depth image subsequent to the first depth image into the groups.

16. An apparatus for estimating and tracking poses of a subject, comprising:

a depth camera configured generate a first depth image by capturing data points of the subject, the first depth image representing distances from the depth camera to different parts of the subject;

a labeling module coupled to the depth camera, the labeling module configured to group the data points into a plurality of segments of the data points based on, at least, depth profiles of the data points and spatial positions of the data points, the labeling module further configured to group the segments of the data points into the labeled parts of the subject based on, at least, spatial relationships between the segments and constraint conditions, the labeling module comprising:

a cost calculation module configured to calculate a cost of assigning the segments to the labeled parts; and a section adjustment module coupled to the cost assignment module and configured to assign the segments to the labeled parts where the cost is minimized; and a model fitting module coupled to the depth camera and the labeling module, the model fitting module configured to fit a model representing the subject to the data points.

17. The apparatus of claim 16, wherein the labeling module is configured to determine the assignment using an optimization algorithm.

18. The apparatus of claim 16, wherein the model fitting module is configured to estimate the pose vector of the model representing the pose of the subject from the vertices of the model and the data points corresponding to the vertices of the model.

* * * * *